Aug. 11, 1964     G. SEIFFERT     3,144,206
THERMOSTATIC TEMPERATURE REGULATOR
Filed April 10, 1962
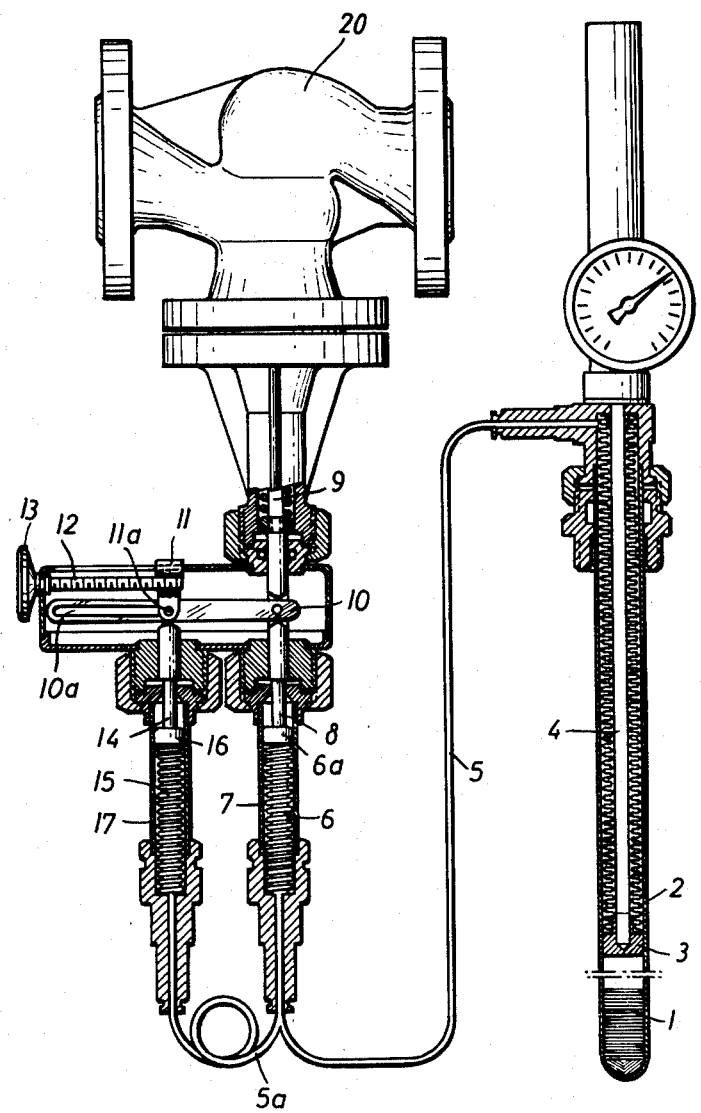
INVENTOR
Günther Seiffert
BY
Richards & Geier
ATTORNEYS 3,144,206
THERMOSTATIC TEMPERATURE REGULATOR
Günther Seiffert, Rodderweg 9, Surth Bezirk,
Cologne, Germany
Filed Apr. 10, 1962, Ser. No. 186,415
Claims priority, application Germany Apr. 12, 1961
7 Claims. (Cl. 236—99)

The present invention relates to a thermostatic temperature regulator without auxiliary power in which valve adjusting means comprises a working bellows actuated by a heat expansible fluid contained in a temperature sensing device connected to the bellows. The sensing device responses to the temperature in the space the temperature of which is to be regulated. When there is an undesired change of temperature in this space the sensing device gives a control impulse which effects adjustment of the valve regulating the supply of heat to the space. The control impulse consists in a change of pressure in the fluid filling the sensing device and working bellows which brings about a change in the expansion of the bellows.

The working bellows is coupled by a spindle or the like with the disc, slider or the like of the valve so that changes in length of the bellows effect adjustment of the valve.

The change in temperature necessary to adjust the valve through its whole range of adjustments is referred to as the proportional range. This proportional range in the known thermostatic temperature regulators without auxiliary power is unchangeably fixed by the construction.

In many cases of regulation a regulator with fixed proportional range is sufficient. The necessity often arises however of being able to vary the proportional range in order to adapt the regulator to its regulating function. An important factor here is that regulators with a small proportional range have a tendency to oscillate or hunt but show a small departure from the desired value with changes of load, while regulators with a large proportional range are not inclined to oscillate or hunt but with them larger temperatures from the desired value are possible. It is therefore desirable for it to be possible to adjust the proportional range so that oscillations or hunting are just eliminated while departures from the desired value are not too great.

The purpose of the invention is to provide a thermostatic temperature regulator the proportional range of which is adjustable without auxiliary power being necessary.

This is achieved according to the invention by the interior of the sensing device being connected to an auxiliary bellows as well as to the working bellows, the auxiliary bellows being so mechanically coupled to the working bellows that it effects a movement which is positively proportional to the movement of the working bellows while the ratio of movement of the working bellows and auxiliary bellows is adjustable.

Desirably the auxiliary bellows is connected in parallel with the working bellows. It is possible however to arrange the two bellows one behind the other that is in series.

According to a further development of the invention the auxiliary bellows is connected with the working bellows through a lever pivoted to the spindles of the two bellows, the fulcrum of which is adjustable. This lever can be extended beyond the spindles of the two bellows disposed parallel to one another and be provided with the adjustable fulcrum in the extended part.

The adjustable fulcrum can be formed for example by a bearing block which slidably engages with a longitudinal slot in the lever. Advantageously the bearing block is adjustable by means of a manually rotatable screw spindle.

An example of a thermostatic temperature regulator according to the invention is diagrammatically illustrated in section in the accompanying drawing and described below with reference to the drawing.

The temperature regulator illustrated comprises a temperature sensing device 1 the interior of which is filled with a heat expansible fluid. A device for adjusting to the desired temperature value is arranged within the sensing device 1, which comprises a bellows 2 which at one end is secured to the casing of the sensing device while its other end is freely movable and carries an end plate 3. The freely movable end of the bellows 2 with the end plate 3 can be displaced axially by means of a regulating spindle, whereby the volume of the interior of the device 1 filled with the fluid can be adjustable.

A pipe 5 connects the space within the device 1 filled with the fluid with a working bellows 6, one end of which freely movable in a sleeve 7 and closed by the end plate 6a is connected to a spindle 8 which actuates the spindle 9 of a conventional regulating valve 20.

To the spindle 8 is pivoted one end of a lever 10 the other end portion of which has a longitudinal slot 10a. A bearing block 11 slidably engages in the slot 10a and is adjustable by means of a screw spindle 12 and hand wheel 13 so that the bearing pin 11a can be engaged where desired along the slot 10a. The pin 11a forms the fulcrum for the lever 10. Thus by displacing the bearing block 11 the length of the lever arm on which acts the adjusting force exerted by the spindle 8 on the lever 10 is varied.

The same applies to the adjusting force which is exerted by swinging of the lever 10 on the spindle 14 of an auxiliary bellows 15, which through the connecting pipe 5a is connected in parallel with the working bellows 6. The spindle 14 is connected with an end plate 16 on the end of the bellows 15 freely movable in a sleeve 17.

The coaction of the lever 10 with the spindle 14 can be achieved by the lever 10 merely bearing under pressure on the upper end of the spindle 14 or by its being actually pivoted to the spindle 14.

When the working bellows 6 changes its length consequent upon a change of pressure in the heat expansible fluid the lever 10 is rocked. It compels the bellows 15 to make a movement proportional to the movement of the bellows 6 if the bearing block 11 is not as shown in the drawing so adjusted that the fulcrum of the lever 10 lies in the axis of the bellows 15. The ratio of the movement of the working bellows 6 and the movement of the auxiliary bellows 15 is determined by the adjustment of the bearing block 11.

When the bearing block 11 is so adjusted that the bellows 15 also moves when the working bellows moves, the auxiliary bellows 15 accommodates a part of the displaced fluid so that the sensing device 1 must be heated to a greater or lesser extent for the working bellows and therefore the valve to make its total movement. By changing the diameter of the auxiliary bellows 15 a differently adjustable proportional range can be obtained.

The invention is not limited to the example illustrated and described. Numerous modifications are possible without departing from the scope of the invention. Thus it is possible for example to arrange the auxiliary bellows coaxially with the working bellows in which case it can be connected in parallel or in series with the working bellows.

I claim:

1. A thermostatic temperature regulator comprising a temperature sensing device adapted to be filled with a heat expansible fluid, a working bellows, an auxiliary bellows, means enclosing said two bellows, a pipe connecting said temperature sensing device with the first-mentioned means for supplying said fluid from said temperature sensing device to ends of said two bellows, members connected to opposite ends of said two bellows and movable along with the two bellows when the bellows are actuated by said fluid, leverage means connected with said two members and swingable by the movement of at least one of said members, means connected with said leverage means for varying the leverage thereof to vary the ratio of movement of said two members, and a regulating device coupled with said working bellows for regulating the heating medium to be controlled.

2. A thermostatic temperature regulator according to claim 1 in which the auxiliary bellows is connected in parallel with the working bellows.

3. A thermostatic temperature regulator comprising a temperature sensing device adapted to be filled with a heat expansible fluid, a working bellows, an auxiliary bellows, means enclosing said two bellows, a pipe connecting said temperature sensing device with the first-mentioned means for supplying said fluid from said temperature sensing device to ends of said two bellows, members connected to opposite ends of said two bellows and movable along with the two bellows when the bellows are actuated by said fluid, a lever connected with at least one of said members and engaged by the other member and swingable by the movement of at least one of said members, means connected with said lever for adjusting the fulcrum thereof to vary the ratio of movement of said two members, and a regulating device coupled with said working bellows for regulating the heating medium to be controlled.

4. A thermostatic temperature regulator according to claim 3 in which the two bellows are arranged in side-by-side relation, the lever is transverse to the direction of movement of the bellows and the range of movement of the adjustable fulcrum is located alongside the auxiliary bellows and remote from the working bellows.

5. A thermostatic temperature regulator in accordance with claim 3, wherein the means varying the fulcrum of the lever comprise a pin, said lever having a longitudinal slot in sliding engagement with said pin, and a movable bearing block carrying said pin.

6. A thermostatic temperature regulator according to claim 5, wherein the means varying the fulcrum of the lever also include a screw spindle for moving the bearing block and manual means for rotating the screw spindle.

7. A thermostatic temperature regulator comprising a temperature sensing device adapted to be filled with a heat expansible fluid, a working bellows, an auxiliary bellows located alongside said working bellows, means enclosing said two bellows, a pipe connecting said temperature sensing device with the first-mentioned means for supplying said fluid from said temperature sensing device to ends of said two bellows, members connected to opposite ends of said two bellows and movable along with the two bellows when the bellows are actuated by said fluid, a lever connected with at least one of said members and engaged by the other member and swingable by the movement of at least one of said members, said lever extending transversely to said two bellows and having a part extending beyond said auxiliary bellows, means engaging said part of the lever and constituting a fulcrum for the lever, manual means connected with the last-mentioned means for adjusting the position of said fulcrum to vary the ratio of movement of said two members, and a regulating valve coupled with said working bellows for regulating the heating medium to be controlled.

References Cited in the file of this patent
UNITED STATES PATENTS

| | | |
|---|---|---|
| 1,499,278 | Wingfield | June 24, 1924 |
| 2,247,056 | Howard | June 24, 1941 |
| 2,264,263 | Erbguth | Nov. 25, 1941 |
| 2,371,428 | De Giers et al. | Mar. 13, 1945 |